United States Patent [19]
Wyss

[11] Patent Number: 5,708,223
[45] Date of Patent: Jan. 13, 1998

[54] REMOTE SENSING ICE MERCHANDISER

[75] Inventor: Thomas J. Wyss, New Libson, Wis.

[73] Assignee: Leer Manufacturing Limited Partnership, New Lisbon, Wis.

[21] Appl. No.: 591,896

[22] Filed: Jan. 25, 1996

[51] Int. Cl.$^6$ .................................................. G01M 19/00
[52] U.S. Cl. .......................... 73/865.9; 62/129; 73/293
[58] Field of Search .......................... 73/865.9, 293; 62/125, 129

[56] References Cited

U.S. PATENT DOCUMENTS

| | | | |
|---|---|---|---|
| Re. 31,089 | 11/1982 | Adamson | 340/825.55 |
| 2,963,885 | 12/1960 | Loewenthal | 62/344 |
| 3,234,750 | 2/1966 | Swanson | 62/137 |
| 3,863,461 | 2/1975 | Bright | 62/137 |
| 3,931,911 | 1/1976 | Kohl | 222/56 |
| 4,412,292 | 10/1983 | Sedam et al. | 364/479 |
| 4,487,065 | 12/1984 | Carlin et al. | 73/290 V |
| 4,719,762 | 1/1988 | Osabe | 62/137 |
| 4,766,548 | 8/1988 | Cedrone et al. | 364/479 |
| 4,853,901 | 8/1989 | Barber | 367/27 |
| 5,091,713 | 2/1992 | Horne et al. | 340/541 |
| 5,131,234 | 7/1992 | Furukawa et al. | 62/137 |
| 5,207,784 | 5/1993 | Schwartzendruber | 221/6 |
| 5,337,289 | 8/1994 | Fasching et al. | 367/140 |
| 5,361,216 | 11/1994 | Warn et al. | 364/510 |
| 5,400,253 | 3/1995 | O'Connor | 364/442 |
| 5,442,568 | 8/1995 | Ostendorf et al. | 364/479 |
| 5,464,087 | 11/1995 | Bounds et al. | 194/200 |

*Primary Examiner*—Thomas P. Noland
*Attorney, Agent, or Firm*—Lathrop & Clark

[57] ABSTRACT

Bagged ice is presented to consumers in an insulated cabinet having a storage chamber accessible through a front door. Photo-electric eyes are mounted within the cabinet to direct several beams of light across the chamber. When the level of bagged ice within the chamber has been depleted to a first level, one of the beams is no longer broken by the product. When it has been further depleted, a second, lower, beam is no longer broken. Information about the bagged ice level is collected by an electronic controller, and dispatched to an inventory control station by a communicator, which may be a telephone connection, a radio transmitter or a cellular telephony connection. An alternative embodiment has an acoustic transducer mounted within the cabinet to direct sound waves down into the chamber. The transducer detects waves reflected by the bagged ice, allowing the controller to compose a representation of the disposition of products within the chamber. The quantities of product are thus more accurately determined, especially in view of the irregular shape of the bagged ice. The representation may aid in the remote detection of unauthorized products within the chamber. When reduced levels of inventory are detected, a stockman may be dispatched to replenish the bagged ice.

4 Claims, 2 Drawing Sheets

5,708,223

REMOTE SENSING ICE MERCHANDISER

FIELD OF THE INVENTION

The present invention relates to consumer display cases in general and to refrigerated display cases for bagged ice products in particular.

BACKGROUND OF THE INVENTION

The modern processes of marketing and seeing consumer items is highly dependent on point-of-sales display cases. The modern consumer expects to be able to examine and select each item of intended purchase. This can be especially true of frozen food items including ice. By examining the intended purchase item, the consumer assesses its quantity, freshness, and size. For example the typical purchaser of bagged ice needs to see and even heft the product in order to determine the quantity of ice needed.

Wholesalers of grocery store items typically stock and maintain the display shelves or cases in grocery stores or convenience stores. For some items which are particularly perishable, such as bread, the items may be inventoried and stocked daily. Other types of items may need stocking only at irregular intervals. This is particularly true for bagged ice where demand can be quite variable depending on such factors as the weather, holidays and the demand of one or a few consumers who can deplete the entire inventory of bag ice for a party or other special event.

For vending machines, which also may experience variable demand, systems have been developed for inventorying the stock sold and notifying a central dispatch center periodically or when inventory is low. In vending machines this process of inventorying the amount of stock on hand is greatly simplified by monitoring each item as it is dispensed. However, bagged ice is irregular in shape, and, because of its great size and weight, is not readily susceptible to being dispensed in discrete increments.

What is needed is an apparatus and method for monitoring the inventory of bagged ice in a display case and communicating the inventory levels to the ice wholesaler.

SUMMARY OF THE INVENTION

The bagged ice inventory monitoring and reporting system of this invention has an insulated cabinet in which bagged ice is presented to consumers. Photoelectric eyes are mounted within the cabinet to direct several beams of light across the chamber. When the level of bagged ice within the chamber has been depleted to a first level, one of the beams is no longer broken by the product. When it has been further depleted, a second, lower, beam is no longer broken. Information about the bagged ice level is collected by an electronic controller, and dispatched to a inventory control station by a communicator, which may be a telephone connection, a radio transmitter or a cellular telephony connection.

An alternative embodiment system of this invention employs an ultrasonic transducer and receiver which images the bagged ice in an ice display cabinet and transmits that ultrasonic image to the ice wholesaler. The image may then be readily analyzed to assess the inventory of bagged ice and thus used to schedule delivery and restocking of bagged ice to the retailer. The image also allows a quantitative determination of the amount of ice remaining which can be used to predict when replenishment of the ice inventory will be required. This quantitative information can then be used to schedule the production and delivery of the bagged ice in advance of actual need. This advanced knowledge can reduce needed production capability and storage facilities. In the case of ice, where production and storage are capital intensive, better inventory control can result in substantially lower costs.

A transducer is mounted in the ice display cabinet above the storage chamber to view the inventory of ice. The transducer sends out a stream of ultrasonic pulses which are mechanically or electronically scanned across the width of the cabinet. Between sending out ultrasonic pulses the transducer receives reflected ultrasonic sound waves from the discontinuities produced by the ice and the bag containing the ice. A controller with a signal processor produces a profile of the level of ice in the cabinet from the ultrasonic reflections of the ultrasonic pulses. This information is transmitted with or without data compression to the ice wholesaler. Transmissions of the cabinet contents profile can be by phone over either ground lines or cellular telephony, or by satellite, by radio transmission, or by local network.

It is an object of the present invention to provide a bagged ice merchandiser which will automatically signal an ice supplier when ice quantities are low.

It is another object of the present invention to provide a bagged ice merchandiser inventory control system which allows monitoring of placement of unauthorized products within the merchandiser.

It is an additional object of the present invention to provide a system for determining the level of bagged ice product within a merchandiser.

Further objects, features and advantages of the invention will be apparent from the following detailed description when taken in conjunction with the accompanying drawings.

DESCRIPTION OF THE PREFERRED EMBODIMENT

Figure 1:
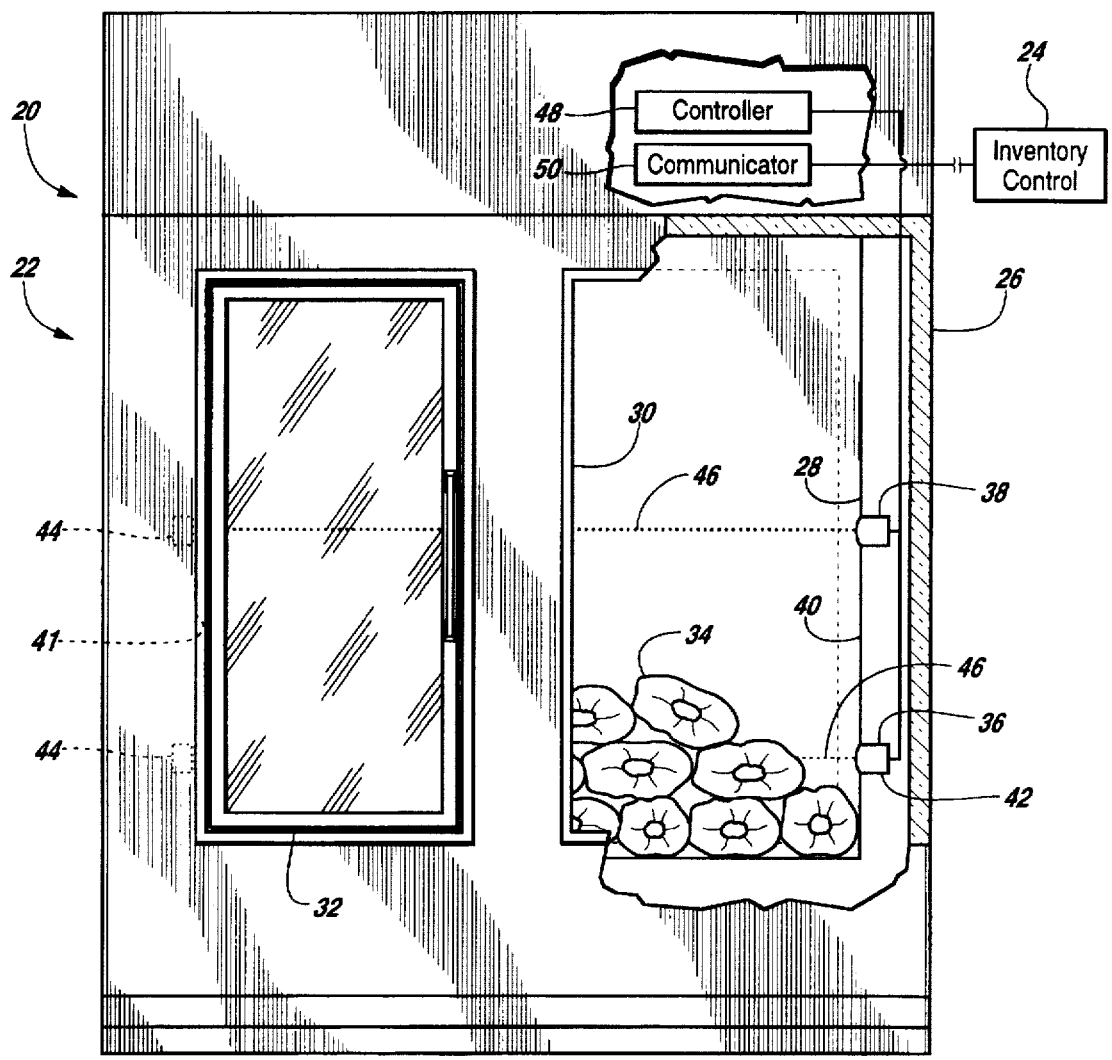
FIG. 1 is a front elevational view, partially broken away in section, of an ice merchandiser of this invention with photo-electric bagged ice level detectors, with electronic components indicated schematically.
Figure 2:
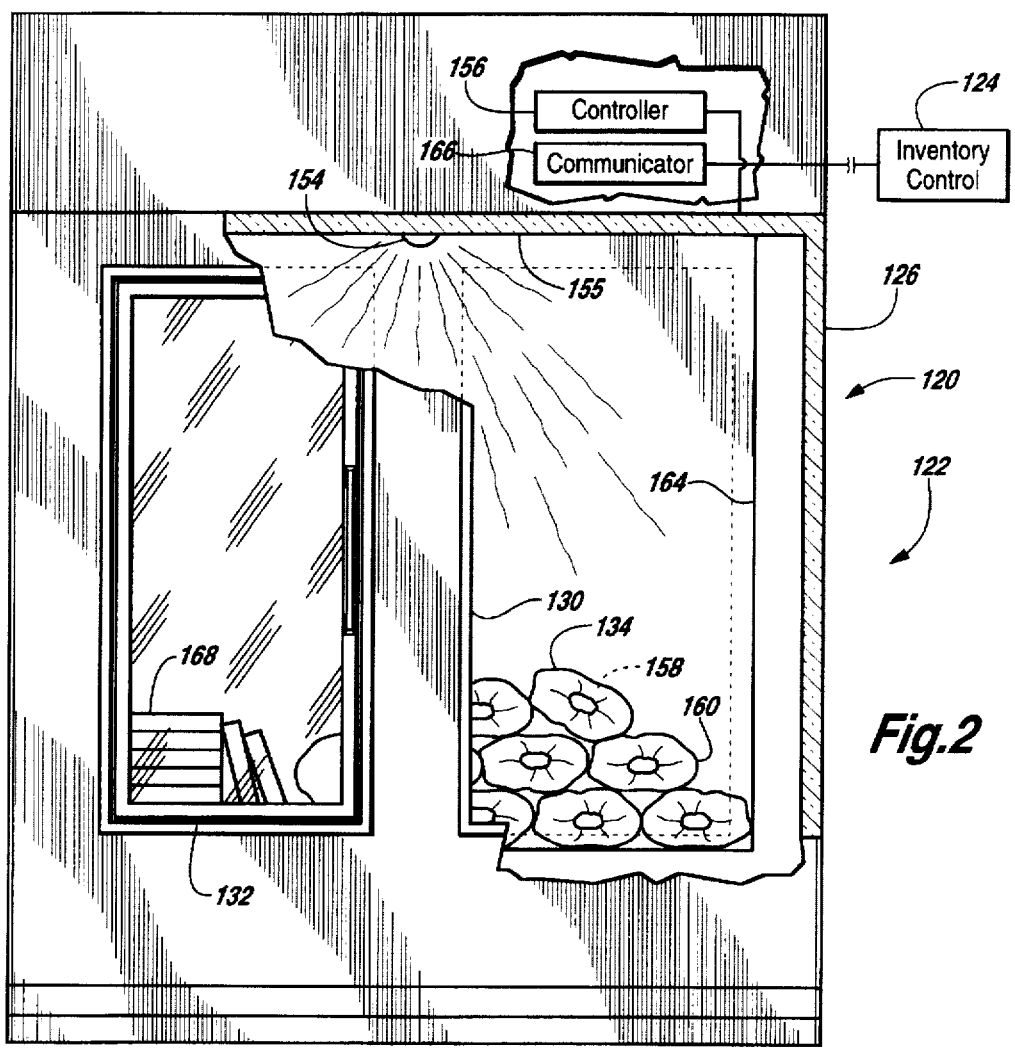
FIG. 2 is a front elevational view, partially broken away in section, of an alternative embodiment ice merchandiser of this invention with an acoustic transducer bagged ice level detector, with electronic components indicated schematically.
Figure 3:
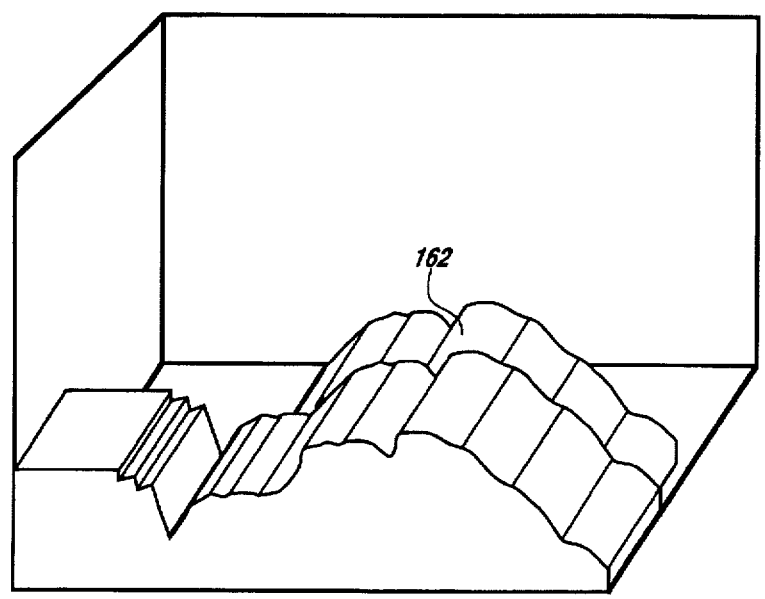
FIG. 3 is a display of the interior of the ice merchandiser of FIG. 2 as generated by the transducer of FIG. 2.

Referring more particularly to FIGS. 1–3, wherein like numbers refer to similar parts, an ice merchandiser 20 of this invention is shown in FIG. 1. The merchandiser 20 is part of an ice merchandiser inventory system 22 which comprises one or more merchandisers intermittently electronically connected to a central inventory control 24. The inventory control 24 may be an independent computer or a display at a central location which allows the manufacturer or supplier of bagged ice to determine the level of need for new product at all connected merchandisers 20. Hence, the merchandiser 20 is provided with a means for determining the level of bagged ice in the merchandiser at any time.

The merchandiser 20 has a conventional insulated cabinet 26 which is preferably kept at temperatures below freezing by a refrigeration system, not shown. The cabinet 26 has walls which define an interior storage chamber 28 which has a frontwardly accessible access opening 30. A door 32 is hinged to selectively uncover the access opening and to thus permit customer access to bagged ice 34 contained within the storage chamber 28. The cabinet may be of any desired size. The exemplary merchandiser 20 has two doors 32 opening on a single storage chamber 28. However, it should be noted that a single door, or more than two doors may be employed with different merchandiser designs.

Bagged ice 34 is typically not produced on site by the retailer, but is manufactured in large quantities by a wholesaler or producer with access to large scale refrigeration equipment and water of desireable quality. The ice in the form of blocks, small cubes, or chips is typically retained within transparent plastic bags. The bags are filled with predetermined quantities by weight of ice. Various sizes of bagged ice packages will be stored in a single merchandiser 20, ranging from a few pounds to 20 pounds or more. Hence the bagged ice 34 is arrayed within the cabinet 26 in an unpredictable pattern, depending on the particular mix of product loaded into the chamber 28 on any particular occasion.

The maximum level of bagged ice 34 in the chamber 28 is determined by upper and lower photo-electric sensors 38, 36. Each sensor or "electric eye" consists of a light-emitting and detecting unit 42 which is mounted to a horizontal wall 40 of the cabinet 26 and a reflector 44 which is mounted to an opposite wall 41 of the cabinet. Each light-emitting unit 42 projects a beam of light 46 which extends horizontally across the storage chamber 28, strikes the reflector 44, and returns to the unit 42 for detection. Although a shallow depth merchandiser may require only a single column of two sensors, in the illustrated embodiment 20, two vertically extending columns of upper and lower sensors 38, 36 are positioned within the chamber 28, one behind the other. Each column is positioned to direct a beam of light at a row of stacked bags of ice. Typically, a first row of ice will extend along the back of the chamber, and a second row of ice will extend along the front. The sensors 36 are placed one above the other. In an exemplary arrangement, the lower sensors 36 may be approximately one foot above the floor of the storage chamber 28, while the upper sensors 38 may be approximately two and a half feet above the floor.

A signal is sent by each sensor 36, 38 through wires to a controller 48 which may be located within the cabinet 26 or which may be mounted to the cabinet or to a wall nearby. The controller 48 may be a microproccesor or an assembly of relays, which responds to the signals from the sensors to send a message to the centralized inventory control 24 to inform the wholesaler that the particular merchandiser 20 is in need of replenishment. The message is sent by a communicator 50 which is electrically connected to the controller 48. The communicator 50 may utilize a landline telephone connection, a radio transmitter or a cellular telephony connection. The communicator thus signals the need to restock the cabinet with additional bagged ice when ice levels fall below a predetermined level. The controller 48 and communicator 50 may be placed on top the cabinet and surrounded by a cover. The absence of bagged ice within the storage chamber above the upper sensor level causes the upper photo-electric sensor to detect a reduced level of stock within the storage chamber, and the absence of bagged ice within the storage chamber above the lower level causes the lower photo-electric sensor to detect a further reduced level of stock within the storage chamber. Furthermore, this level information is provided for both the front row and the rear row of ice bags.

An alternative embodiment merchandiser 120 employing an ultrasonic sensor is shown in FIGS. 2 and 3. The merchandiser 120 is similar to the merchandiser 20, and is part of an ice merchandiser inventory system 122 which comprises one or more merchandisers intermittently electronically connected to a central inventory controller 124.

The merchandiser 120 has an insulated cabinet 126 which is preferably kept at temperatures below freezing by a refrigeration system. The cabinet 126 has walls which define an interior storage chamber 128 which has a frontwardly accessible access opening 130. A door 132 is hinged to selectively uncover the access opening and to thus permit customer access to bagged ice 134 contained within the storage chamber 128.

The merchandiser 20 can indicate the amount of bagged ice 34 in discrete intervals. Greater accuracy however can be obtained through the use of an ultrasonic detection means which comprises an ultrasonic transducer 154 mounted at the top 155 of the cabinet 126. The transducer 154 is connected to a microprocessor or controller 156. The controller generates precisely timed pulses of electrical energy which are sent to the transducer 154 where the pulses are transferred to a piezoelectric element or crystal or a piezoelectric foil. The stimulation of the piezoelectric element causes it to expand and contract which generates high frequency sound. The sound travels out from the transducer 154 at the speed of sound of approximately 1,000 feet per sec. When the high frequency sound impacts the bags of ice 134 the change in media through which the sound is propagating causes the sound to reflect off the ice 158 and to a lesser extent the plastic bags 160 containing the ice 158. The reflective sound returns to the transducer 154 where the piezoelectric element, in response to the sound waves impacting the surface of the piezoelectric crystal or foil, generates an electric signal which is detected and timed by the controller 156.

The controller compares the time between when the signal was generated and when the reflected signal was detected and, using the known speed of sound, determines the distance between the transducer 154 and the bagged ice 134. In order to determine the height of the bagged ice 134 at more than one point along the width of the cabinet 126, multiple sensors could be arrayed along the width.

A three dimensional contour map 162 of the interior 164 of the cabinet 126, as shown in FIG. 3, is produced by the transducer in any known way, for example by scanning the ultrasonic transducer in two dimensions, back-and-fourth and side-to side.

Alternatively, a single sensor which is scanned back and forth either mechanically or by utilizing a phased array of piezoelectric transducers which can be electronically steered may be used, for narrow depth cabinets, where front-to-back information is not essential. Such a transducer 154 preferably has a relatively narrow beam which when scanned from side to side will generate a profile of the interior 164 of the cabinet. Thus a profile will give a complete picture of the amount of ice remaining in the cabinet 126. Because such a profile consists of a single contour, the profile may be readily sent over a low-dam-rate communication system at low cost.

Once the dam is received by the ice wholesaler it can be analyzed by a computer which can determine the percentage of the cabinet volume which is filled. Alternatively an operator could view the images in rapid succession and classify the generated profiles by simply keying in a single keystroke indicative of the conditions of a particular ice merchandiser 122.

In addition to allowing the wholesaler to determine when the merchandiser needs to be restocked with ice, the transducer, by providing a three-dimensional representation of the contents of the merchandiser, allows a wholesaler to determine whether unauthorized products are being stored in the merchandiser. In some cases, the merchandisers are supplied by the wholesaler, and thus should be exclusively for the wholesaler's ice products. By examining the transducer data, a wholesaler may discover if other products, such as pizzas 168 have been stored therein contrary to contractual arrangements. The controller may be programmed to call the inventory control at regular intervals, or only at such time as certain minimum threshholds of product are reached.

It should be understood that although the merchandisers are shown with glass doors, opaque doors may also be employed. It should also be understood that a fan beam which spans the width of the cabinet 126 and produces an average profile across the width could be used.

It is understood that the invention is not limited to the particular construction and arrangement of parts herein illustrated and described, but embraces such modified forms thereof as come within the scope of the following claims.

I claim:

1. An ice merchandiser inventory system comprising:
   a) an insulated cabinet having walls defining a product storage chamber, wherein portions of the cabinet define an access opening for customer access to bagged ice contained within the storage chamber;
   b) at least one door mounted to the cabinet, wherein the door may be opened for access to the storage chamber;
   c) means for determining the level of bagged ice contained within the storage chamber mounted within the cabinet;
   d) a controller electrically connected to the level determining means; and
   e) a communicator electrically connected to the controller, wherein the controller passes information with respect to the bagged ice level detected by the level determining means through the communicator to an inventory control apparatus at a location remote from the cabinet, to thereby signal the need to restock the cabinet with additional bagged ice when ice levels fall below a predetermined level.

2. The system of claim 1 wherein the means for determining the level of bagged ice contained within the storage chamber comprises:
   a) a first photo-electric sensor mounted within the cabinet to direct a first light beam at a first level across the storage chamber; and
   b) a second photo-electric sensor mounted within the cabinet to direct a second light beam across the storage chamber at a second level which is higher than the first level, whereby the absence of bagged ice within the storage chamber above the second level causes the second photo-electric sensor to detect a reduced level of stock within the storage chamber, and the absence of bagged ice within the storage chamber above the first level causes the first photo-electric sensor to detect a further reduced level of stock within the storage chamber.

3. An ice merchandiser comprising:
   a) an insulated cabinet having walls defining a product storage chamber, wherein portions of the cabinet define an access opening for customer access to bagged ice contained within the storage chamber;
   b) at least one door mounted to the cabinet, wherein the door may be opened for access to the storage chamber;
   c) a first photo-electric sensor mounted within the cabinet to direct a first light beam at a first level across the storage chamber, whereby the absence of bagged ice within the storage chamber above the first level causes the first photo-electric sensor to detect a reduced level of stock within the storage chamber;
   d) a controller electrically connected to the sensor; and
   e) a communicator electrically connected to the controller, wherein the controller passes information with respect to the bagged ice level detected by the first sensor through the communicator to an inventory control apparatus at a location remote from the cabinet, to thereby signal the need to restock the cabinet with additional bagged ice when ice levels fall below a predetermined level.

4. The ice merchandiser of claim 3 further comprising a second photoelectric sensor mounted within the cabinet to direct a second light beam across the storage chamber at a second level which is higher than the first level, whereby the absence of bagged ice within the storage chamber above the second level causes the second photo-electric sensor to detect a reduced level of stock within the storage chamber, and the absence of bagged ice within the storage chamber above the first level causes the first photo-electric sensor to detect a further reduced level of stock within the storage chamber.

* * * * *

UNITED STATES PATENT AND TRADEMARK OFFICE
CERTIFICATE OF CORRECTION

PATENT NO. : 5,708,223
DATED : January 13, 1998
INVENTOR(S) : Thomas J. Wyss

It is certified that error appears in the above-identified patent and that said Letters Patent is hereby corrected as shown below:

In column 1, line 12 change "The modem consumer" to -- The modern consumer --.

In column 4, line 58 change "over a low-dam-rate" to -- over a low-data-rate --.

In column 4, line 59 change "Once the dam is received" to -- Once the data is received --.

Signed and Sealed this

Twenty-seventh Day of October, 1998

*Attest:*

BRUCE LEHMAN

*Attesting Officer*    Commissioner of Patents and Trademarks